United States Patent
Naujoks et al.

(10) Patent No.: US 12,234,862 B2
(45) Date of Patent: Feb. 25, 2025

(54) ROLLING-ELEMENT BEARING

(71) Applicant: AKTIEBOLAGET SKF, Gothenburg (SE)

(72) Inventors: Bernd Walter Norbert Naujoks, Schwebheim (DE); Andreas Herbert Kraus, Bergrheinfeld (DE); Juergen Netzer, Burscheid (DE)

(73) Assignee: AKTIEBOLAGET SKF, Gothenburg (SE)

( * ) Notice: Subject to any disclaimer, the term of this patent is extended or adjusted under 35 U.S.C. 154(b) by 165 days.

(21) Appl. No.: 17/942,325

(22) Filed: Sep. 12, 2022

(65) Prior Publication Data

US 2023/0095344 A1    Mar. 30, 2023

(30) Foreign Application Priority Data

Sep. 30, 2021 (DE) .......................... 102021210944.6

(51) Int. Cl.
*F16C 33/66* (2006.01)
*F16C 19/06* (2006.01)

(52) U.S. Cl.
CPC .......... *F16C 33/6674* (2013.01); *F16C 19/06* (2013.01); *F16C 33/6681* (2013.01)

(58) Field of Classification Search
CPC .. F16C 33/66; F16C 33/6622; F16C 33/6625; F16C 33/6629; F16C 33/6659; F16C 33/6674; F16C 33/6681; F16C 33/6685
See application file for complete search history.

(56) References Cited

U.S. PATENT DOCUMENTS

| | | | |
|---|---|---|---|
| 4,808,012 A * | 2/1989 | Otto ....................... | F16J 15/406 |
| | | | 277/351 |
| 10,619,673 B2 * | 4/2020 | Hirose .................. | F16C 19/364 |
| 11,555,519 B1 * | 1/2023 | Natusch .............. | F16C 33/3887 |
| 2016/0319872 A1 * | 11/2016 | Price .................... | F16C 33/6677 |
| 2020/0386317 A1 * | 12/2020 | Arai ....................... | F16C 19/185 |

FOREIGN PATENT DOCUMENTS

WO    WO-2018090915 A1 *  5/2018  ............. F16C 33/58

* cited by examiner

*Primary Examiner* — James Pilkington
(74) *Attorney, Agent, or Firm* — J-TEK LAW PLLC; Scott T. Wakeman; Mark A. Ussai

(57) ABSTRACT

A rolling-element bearing for a device lubricated with a fluid includes first and second bearing rings defining an interior therebetween in which rolling elements support the first ring for rotation relative to the second ring. A pumping device is located at the interior for pumping the fluid into and/or out of the interior when an element of the rolling-element bearing rotates and the rolling-element bearing is at least partially submerged in the fluid. The pumping device may be a ring having vanes that is attached to the first bearing ring or to a cage of the bearing.

6 Claims, 2 Drawing Sheets

ROLLING-ELEMENT BEARING

CROSS-REFERENCE

This application claims priority to German patent application no. 10 2021 210 944.6 filed on Sep. 30, 2022, the contents of which are fully incorporated herein by reference.

TECHNOLOGICAL FIELD

The present invention relates to a rolling-element bearing having a pumping element for affecting an amount of lubricant in the bearing interior.

BACKGROUND

In order to discharge heat from a rolling-element bearing and to keep losses due to friction as low as possible, it is known to provide a lubricant, such as, for example, a lubricating oil, in the rolling-element bearing. If the rolling-element bearing is disposed, for example, in a device that is lubricated with a fluid lubricant, the fluid lubricant used in the device can also be used for lubricating the rolling-element bearing. For this purpose, however, it is necessary that the lubricant can also penetrate from the environment into the rolling-element bearing.

However, if too much fluid lubricant penetrates into the rolling-element bearing, for example because the rolling-element bearing is at least partially surrounded by the lubricant, the friction in the rolling-element bearing can increase due to, among other things, an excess amount of lubricant in the rolling-element bearing. This in turn can lead to further power losses of the rolling-element bearing. The power losses caused by excess lubricant are also referred to as "churning losses." The friction and/or the power loss that are generated in a rolling-element bearing by churning losses are generally very high. In contrast to losses from rolling and/or sliding friction, which can be influenced by the bearing design itself, the churning losses are more difficult to control.

In order to keep the churning losses as low as possible in rolling-element bearings that are at least partially located in a fluid lubricant, it is known to attach seals or shields to the rolling-element bearing, in particular from outside, with the aid of which seals or shields a gap through which the fluid lubricant can penetrate into the bearing is reduced so that an excess of lubricant in the bearing can be avoided. However, the amount of lubricant that penetrates through the gap into the rolling-element bearing cannot be clearly defined since the amount of the penetrating lubricant results much more from the geometry and the manufacturing tolerances of the bearing components with respect to each other.

Furthermore, it is also difficult to remove from the bearing excess lubricant that has already penetrated into the bearing since in general it can hardly be pumped from the contact region of the rolling elements. In addition, depending on the installation space available, sufficient space may not be available to attach additional seals and shields to the rolling-element bearing.

SUMMARY

It is therefore an aspect of the present disclosure to provide a rolling-element bearing for a device lubricated with a fluid in which a lubricant-caused power loss is reduced even when the rolling-element bearing is partially surrounded by the fluid.

In the following a rolling-element bearing is disclosed for a device lubricated with a fluid in which the rolling-element bearing is at least partially surrounded by the fluid. The rolling-element bearing comprises a first bearing ring and a second bearing ring and at least one row of rolling elements. The bearing rings are rotatable with respect to each other about an axis of rotation and include raceways on which the rolling elements roll. Here the bearing rings furthermore define between them a rolling-element bearing interior in which the rolling elements are disposed.

In order to reduce the lubricant-caused power loss, a pumping device is furthermore provided that is configured to transport the fluid into the rolling-element bearing interior and/or out of the rolling-element bearing interior, wherein the pumping device is attached to a rotating element of the rolling-element bearing.

The pumping device is preferably disposed at least partially in the rolling-element bearing interior so that on the one hand a secure, in particular captive, attachment to the rotating element of the rolling-element bearing can be ensured, and on the other hand the space requirement of the rolling-element bearing can be kept as low as possible. The pumping device can be attached in an interference-fit, friction-fit, or material-bonded manner to the rotating element.

Furthermore, the inner and the outer bearing ring, or the first and the second bearing ring, can each have an axial end surface, wherein the rolling-element bearing interior is delimited in particular by the raceways and the end surfaces. The pumping device advantageously comprises a carrier element that is configured to attach the pumping device to the rotating element, wherein the carrier element is preferably disposed in the rolling-element bearing interior. In particular, the carrier element can be configured such that it does not protrude in the axial direction beyond the end surface of the bearing rings. It can thereby be ensured that the pumping device does not significantly increase the space requirement of the rolling-element bearing so that the described rolling-element bearing can also be used in tight installation situations. Alternatively the carrier element can also be disposed on an outer side of the rolling-element bearing.

Due to the attachment of the at least one pumping device to a rotating element of the rolling-element bearing, the at least one pumping device is able to rotate. In particular, a change of direction of rotation of the at least one pumping device can change a pumping direction of the at least one pumping device. The at least one pumping device can be suited, depending on the direction of rotation, to direct lubricant into the rolling-element bearing interior, and/or transport lubricant out of the rolling-element bearing interior. This can advantageously make it possible, depending on the direction of rotation, to improve the supply of lubricant to and/or the removal of lubricant from the rolling-element bearing interior. In addition, excess lubricant that has already penetrated during stoppage of the bearing can be removed from the rolling element bearing.

According to a further preferred embodiment, the rotating element is the first bearing ring, and the pumping device is attached to the first bearing ring. Due to the installation of the at least one pumping device on the rotating bearing ring, the fluid can be pumped outward by the pumping device so that the lubricant flow can be limited to a necessary minimum and kept away from the moving bearing components. Depending on the installation position and direction of rotation, the pumping device can also be used to direct fluid in the rolling-element bearing in a targeted manner.

Furthermore, the rolling-element bearing can include a cage that is configured to hold and space the rolling elements. Here the cage can represent the rotating element, and the at least one pumping device can be attached to the cage so that it rotates together with the cage. In particular, the pumping device can be formed integrally with the cage. A particularly space-saving realization of the pumping device can thereby be achieved.

According to one preferred embodiment, the at least one pumping device includes at least one pumping element that is formed on the pumping device. In particular, at least one part of the pumping element can protrude beyond the end surface of the bearing rings. Alternatively or additionally, the at least one pumping element can be disposed completely in the rolling-element bearing interior or protrude completely beyond the end surface. In addition, the at least one pumping device can include a plurality of pumping elements, wherein the pumping elements each protrude outward to a different degree. The pumping element may have the form of a vane.

The at least one pumping element can in particular have a shape that is suited to pumping the fluid. For example, the at least one pumping element can be configured turbine-blade-shaped or airfoil shaped, whereby depending on the direction of rotation of the pumping device and/or a position of the pumping element, fluid is advantageously pumped from the bearing interior. Furthermore, the shape of the pumping element can also be dependent on an amount of fluid to be pumped, a viscosity of the fluid, a temperature of the fluid, the rotational speed of the rolling-element bearing, and/or a bearing load. In particular, the precise shape of the pumping element can be determined by simulations and/or experimentally.

The at least one pumping device is preferably configured as a ring, and the at least one pumping element protrudes axially outward from the ring and extends in a radial direction toward the axis of rotation of the rolling-element bearing, wherein the at least one pumping element is preferably angled in one direction, preferably obliquely. The ring is preferably configured as carrier element. For example, the pumping element can be formed integrally with the carrier element. This makes it possible to arrange the at least one pumping device in the rolling-element bearing interior in a space-saving manner. Due to the pumping effect of the at least one pumping element, which can be adjusted, for example, by the shape and/or position of the pumping element, lubricant that has already entered the bearing interior can also be pumped out of the bearing interior so that very uniform operating states can be achieved. Alternatively or additionally, the at least one pumping element can protrude axially inward from the ring and thereby form a type of recess.

For example, the at least one pumping device and/or the at least one pumping element can be formed from plastic. For example, the at least one pumping device and/or the at least one pumping element can be formed from plastic by a shaping method, such as, for example, an injection-molding method.

The at least one pumping element is preferably formed straight, sickle-shaped, and/or triangular. Here the shape and/or the position of the pumping element and/or the rotational speed and/or the direction of rotation of the rolling element can depend on various parameters, such as, for example, the lubricant film thickness that is required for lubricating the rolling-element bearing, a fill level of the fluid in the device, etc. These parameters can be determined, for example, by a simulation and/or experimentally. Furthermore, the level of the churning losses can be calculated depending on a fill level of the fluid in the device. Due to the chosen shape and/or position of the pumping element and/or the rotational speed and/or the direction of rotation of the rolling-element bearing, on the one hand the desired direction in which the fluid is pumped, and on the other hand the amount of fluid that is pumped by the pumping device, can advantageously be set such that the churning losses can be further reduced.

According to one preferred embodiment, the at least one pumping device includes a plurality of pumping elements distributed uniformly or non-uniformly around the at least one pumping device. In particular, the distribution of the plurality of pumping elements can be chosen such that excess lubricant is deflected and/or pumped away.

Further advantages and advantageous embodiments are specified in the description, the drawings, and the claims. Here in particular the combinations of features specified in the description and in the drawings are purely exemplary so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
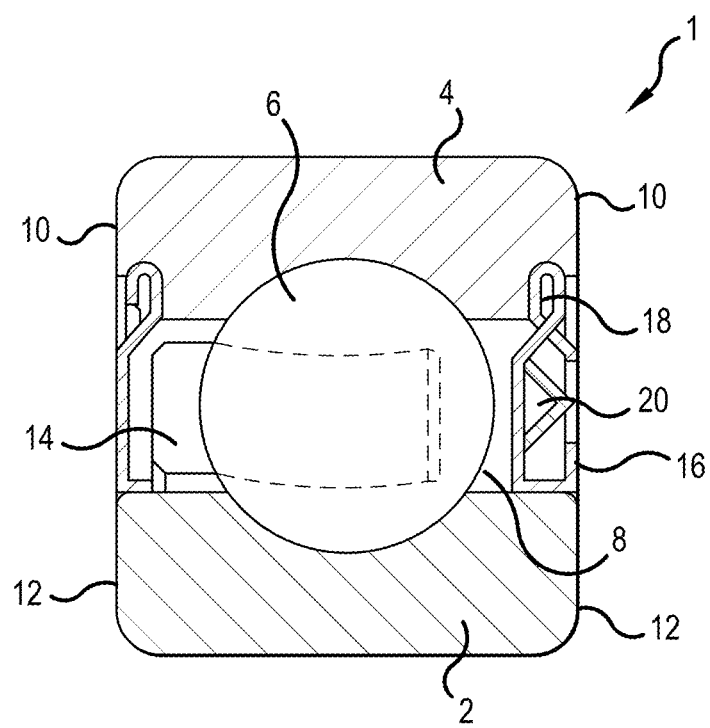
FIG. 1 is a schematic sectional view through a rolling-element bearing according to a first embodiment of the present disclosure.

FIG. 1 shows a schematic sectional view through a rolling-element bearing 1 according to a first embodiment. The rolling-element bearing 1 is suitable in particular to be used in a fluid-lubricated device (not shown) in which the rolling-element bearing is at least partially surrounded by the fluid.

The rolling-element bearing 1 comprises a first bearing ring 2 and a second bearing ring 4, wherein the bearing rings 2, 4 include end surfaces 10, 12 that delimit the bearing rings in the axial direction. A row of rolling elements 6 is disposed between the first and second bearing rings 2, 4. The first bearing ring 2 is rotatable relative to the second bearing ring 4, wherein each of the two bearing rings 2, 4 includes a raceway (not indicated) on which the rolling elements 6 roll.

Furthermore, the rolling-element bearing 1 comprises a rolling-element bearing interior 8 in which the rolling elements are disposed and a cage 14 that is configured to hold and to space the rolling elements 6. That rolling-element bearing interior 8 is defined in the radial direction by the raceways of the bearing rings 2, 4 and in the axial direction by the end surfaces 10, 12 of the bearing rings.

In order to reduce the lubricant-caused power loss, a pumping device 18 is furthermore provided that is configured to pump a lubricant. In the rolling-element bearing 1 of FIG. 1, the pumping device is disposed on the first bearing ring 2, wherein the first bearing ring 2 is the rotating bearing ring. In particular, a change of the direction of rotation of the bearing ring 2, and thus also of the pumping device 18, can thereby change a pumping direction of the pumping device 18 so that depending on the direction of rotation, fluid can be directed into the rolling-element bearing interior 8, and/or fluid can be transported out from the rolling-element bearing interior 8.

The pumping device 18 is configured as a ring 16 that serves as a carrier element and includes a plurality of pumping elements 20 that protrude outward axially from the ring 16. In order to attach the pumping device 18 to the first bearing ring 2, the ring 16 is captively attached to the first bearing ring 2. In particular, the ring 16 can be secured in an interference-fit, friction-fit, and/or material-fit manner to the first bearing ring. Alternatively or additionally, at least one pumping element 18 can protrude axially inward from the ring 16. In particular, the at least one pumping device 18 and/or the at least one pumping element 20 can be formed from plastic, wherein, for example, the pumping elements 20 are formed integrally with the pumping device.

The plurality of pumping elements 20 are configured turbine-blade-shaped and extend in a radial direction toward the axis of rotation of the rolling-element bearing 1. Furthermore, the pumping elements 20 are employed obliquely in one direction. Alternatively the pumping elements can also have other shapes. For example, the pumping elements 20 can be configured triangular, straight, and/or sickle-shaped. Furthermore, the plurality of pumping elements 18 are uniformly distributed circumferentially around the ring 16 but can alternatively also be non-uniformly distributed.

In FIG. 1, the dimensions of the pumping device 18 are chosen such that the pumping device 18 is received in its entirety in the rolling-element bearing interior 8 so that the presence of the pumping device 18 does not increase the space requirement of the rolling-element bearing 1 in the fluid-lubricated device. Alternatively the pumping device 18 can also be disposed only partially in the rolling-element bearing interior 8 and/or be attached outside on the rotating bearing ring 2. In particular, the pumping elements 20 can protrude outward beyond the end surfaces 10, 12.

Figure 2:
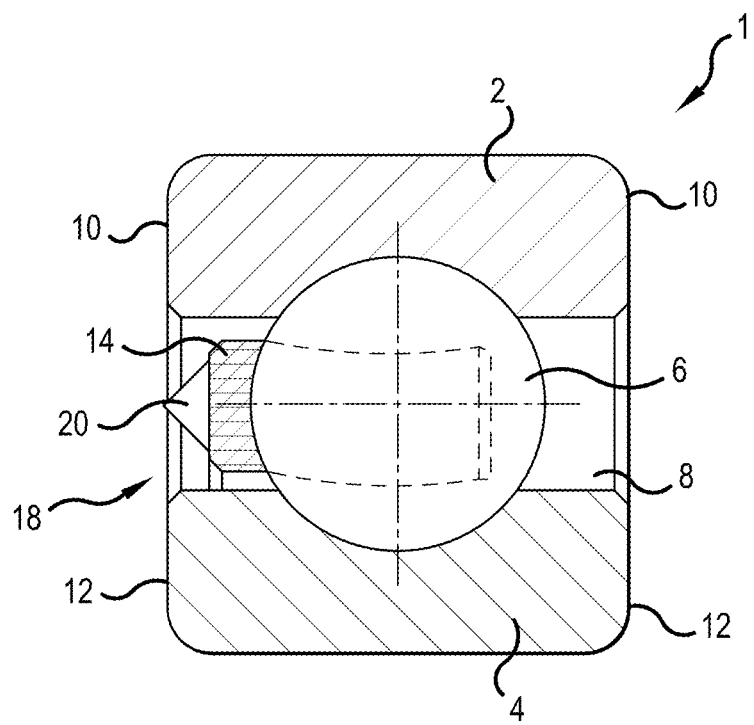
FIG. 2 is a schematic sectional view through a rolling-element bearing according to a second embodiment of the present disclosure.

FIG. 2 shows a schematic sectional view through a rolling-element bearing 1 according to a second embodiment. The rolling-element bearing 1 of FIG. 2 differs from the rolling-element bearing 1 of FIG. 1 in that the pumping device 18 is attached to the cage 14. In particular, the pumping device 18 and the cage 14 can be formed integrally. This makes possible a particularly space-saving arrangement of the pumping device 18 in the rolling-element bearing interior 8.

Figure 3:
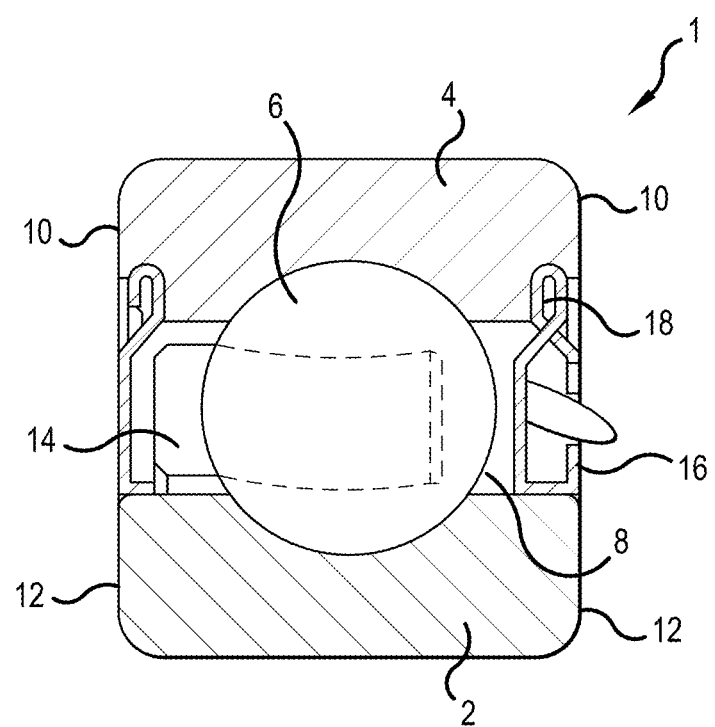
FIG. 3 is a schematic sectional view through a rolling-element bearing according to a third embodiment of the present disclosure.

FIG. 3 shows a schematic sectional view through a rolling-element bearing 1 according to a third embodiment. The rolling-element bearing 1 of FIG. 3 differs from the rolling-element bearing 1 of FIG. 1 in that the pumping element is an airfoil-shaped vane 20' that extends from the ring 16 attached to the bearing ring 2.

In summary, in the rolling-element bearing 1 the lubricant-caused power loss can be reduced by the pumping device 18. The pumping device is configured to pump the fluid into the rolling-element bearing interior 8 and/or out of the rolling-element bearing interior 8, and is attached to a rotating element of the rolling-element bearing 1. The pumping device 18 is advantageously received at least partially in the rolling-element bearing interior 8. This makes it possible to not excessively increase the space requirement of the rolling-element bearing 1, with the result that the described rolling-element bearing 1 can also be used in tight installation situations.

Due to the chosen shape and/or position of the pumping element 20 and/or the rotational speed and/or the direction of rotation of the rolling-element bearing 1 the desired direction in which the fluid is pumped and the amount of fluid that is pumped by the device can advantageously be set so that churning losses can be further reduced.

REFERENCE NUMBER LIST

1 Rolling-element bearing
2, 4 Bearing ring
6 Rolling element
8 Rolling-element bearing interior
10, 12 End surface
14 Cage
16 Ring
18 Pumping device
20 Pumping element

What is claimed is:

1. A rolling-element bearing for a device lubricated with a fluid comprising:
    a first bearing ring having a first raceway and opposing axial ends and a second bearing ring having a second raceway and opposing axial ends, and a rolling-element bearing interior being defined between the axial ends of the first bearing ring and the axial ends of the second bearing ring, the first bearing ring being rotatable with respect to the second bearing ring about an axis of rotation,
    at least one row of rolling elements in the rolling-element bearing interior, and
    a pumping device disposed within the rolling-element bearing interior and including a ring attached to the first bearing ring so as to be spaced axially apart from the rolling elements and a plurality of pumping elements extending axially from the ring of the pumping device, the pumping device being configured to pump lubricant disposed within the bearing interior out from the bearing interior when the first ring rotates in one direction and to pump lubricant into the bearing interior when the first ring rotates in another direction.

2. The rolling-element bearing according to claim 1, wherein each one of the plurality of pumping elements includes a vane.

3. The rolling-element bearing according to claim 2, wherein the plurality of vanes of the pumping elements are uniformly or non-uniformly distributed around the ring of the pumping device.

4. The rolling-element bearing according to claim 2, wherein each vane extends axially and/or at an angle inclined relative to an axial direction.

5. The rolling-element bearing according to claim 2, wherein each vane is airfoil shaped.

6. The rolling-element bearing according to claim 2, wherein each vane is formed from plastic.

* * * * *